Figure 1:
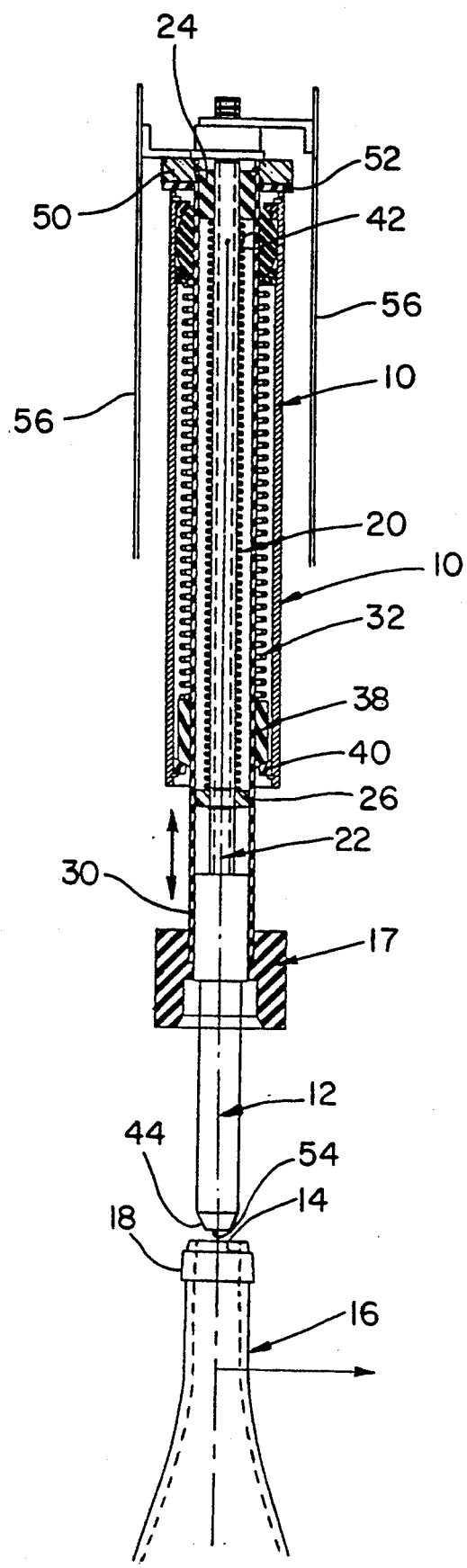

United States Patent [19]

Giometti

[11] Patent Number: 5,313,847
[45] Date of Patent: May 24, 1994

[54] BOTTLE INSPECTING MACHINE
[75] Inventor: Stephen M. Giometti, Horseheads, N.Y.
[73] Assignee: Emhart Industries, Inc., Towson, Md.
[21] Appl. No.: 642,404
[22] Filed: Jan. 17, 1991
[51] Int. Cl.⁵ .............................. G01B 3/46
[52] U.S. Cl. ................................. 73/865.8
[58] Field of Search .................. 73/865.8, 865.9; 209/522, 523, 530-532

[56] References Cited
U.S. PATENT DOCUMENTS 3,771,650 11/1973 Henderson et al. ............ 209/532
3,914,872 10/1975 Strzala ............................ 209/531
4,278,173 7/1981 Pemberton et al. ............ 209/522

FOREIGN PATENT DOCUMENTS 566637 8/1977 U.S.S.R. .......................... 209/532

Primary Examiner—Robert Raevis
Attorney, Agent, or Firm—Spencer T. Smith

[57] ABSTRACT

A plug gager is provided which can be tilted relative to the opening of a bottle to be inspected so that insertion will be assured for acceptable bottles. The plug gager tube assembler is supported at one end in a ball and socket support and is supported at the other end by a pair of taper bushings to permit tilting but normally maintaining the concentricity of the assembly.

2 Claims, 2 Drawing Sheets

BOTTLE INSPECTING MACHINE

The present invention relates to machines which inspect the inner and outer diameter of the opening of a bottle.

Such inspection is carried out by axially driving a plug gage downwardly into the bottle opening and then axially driving a ring gage downwardly around the top of the bottle.

The problem with bottles is that they are not round and they are not straight. When, during inspection, the bottle is held by the body of the bottle, the top or finish of the bottle may vary its position relative to the bottle holder enough so that the plug gage will hit the top of the bottle causing a false reject. This occurs when the body of the bottle is out of round or the neck is bent. On tall bottles the finish is further from the bottle holder, thus making the problem worse. To further complicate the matter, when it is a wine or other bottle that is sealed with a cork, the tolerance between the inside diameter of the finish and the plug gage is smaller. This gives even less room for error.

One previous method of plug gaging these tall bottles was to use a machine which uses a feed screw on the body of the bottle and a conveyor under the bottle to control and transport the bottle. This method of control allows the top of the bottle to move and align itself on the taper of the plug gage. In other machines, the bottle is clamped securely in the machine and it can not move and align to the plug. In either of such machines the finish may vary in position enough to cause the plug gage to miss the opening in the top.

It is accordingly an object of the present invention to provide an inspecting machine wherein a plug gage is used to inspect the finish and wherein acceptable variations in finish location will not cause a false reject to occur.

Other objects and advantages of the present invention will become apparent from the following portion of the specification and from the accompanying drawings, which illustrate, in accordance with the mandate of the patent statutes, a presently preferred embodiment of the invention.

Figure 2:
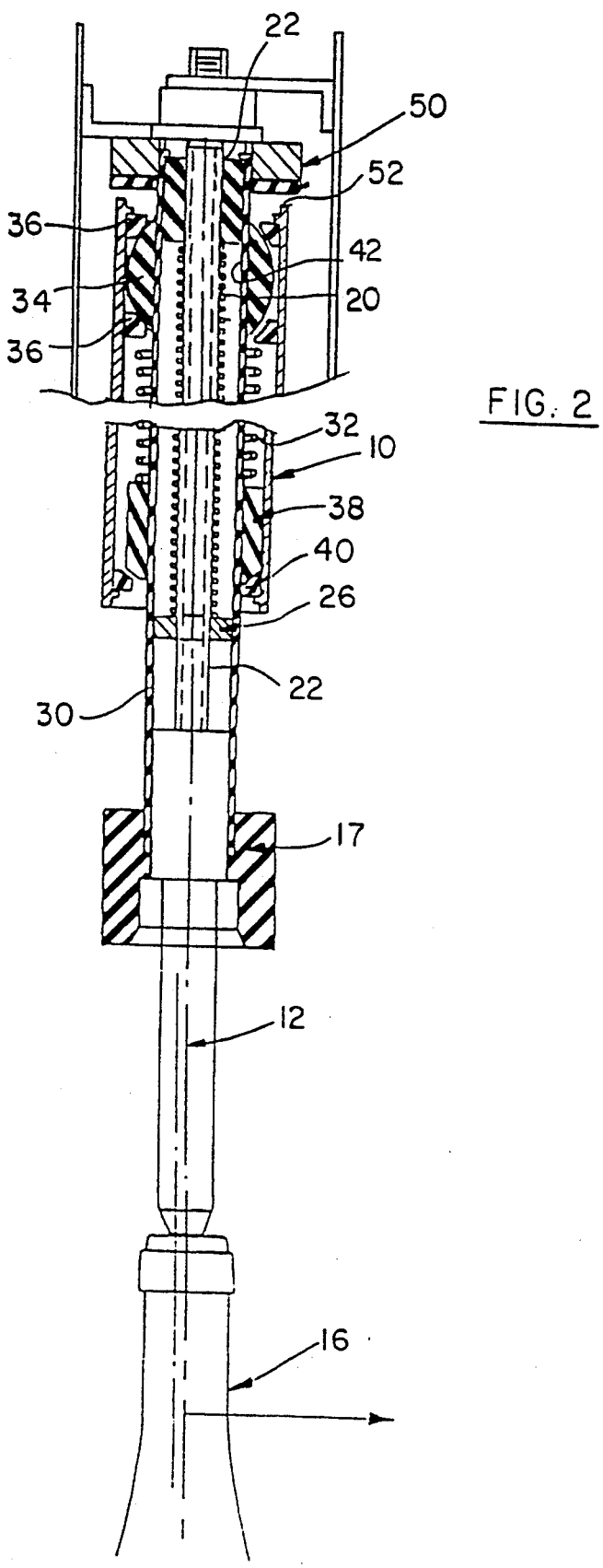

Referring to the drawings:

FIG. 1 is a side elevational view of the plug gaging mechanism of a bottle inspecting machine made in accordance with the teachings of the present invention; and FIG. 2 is a similar view of this plug gaging mechanism as it engages a tilting bottle.

The gaging mechanism includes a driving tube 10 which is mounted on the inspection machine for vertical displacement downwardly from an up position to a first position whereat the plug gage 12 enters the finish (the opening 14 of the bottle 16) and then downwardly to a second position whereat the ring gage 17 receives the top 18 of the bottle.

A plug gage spring 20 is compressively located around the plug gage tube 22 between upper 24 and lower 26 plug gage tube collars to maintain the plug gage normally fully extended.

Should however the plug gage strike the top of the bottle 16 and not enter the opening 14 the driving tube 10 can continue its downward movement without damaging the gage since the upper collar 24 can continue downwardly relative to a stationary lower collar further compressing the spring 20. Similarly, the ring gage 17 is secured to a ring gage tube 30 and a ring gage spring 32 is compressively located around the ring gage tube 30 between the ball 34 and socket 36 bushings and the upper 38 of a pair of taper bushings. The upper taper bushing 38 is secured to the outer diameter of the ring gage tube 30 and the lower taper 40 bushing is secured to the inner diameter of the driving tube 10. The upper portion of the ring gage tube 30 passes through the through hole 42 of the ball 34.

In operation, should the bevelled surface 44 of the plug gage strike the finish the plug gage will pivot about the center of the ball thereby enabling the plug gage to enter the opening 14. As this plug gage is tilted, the upper taper bushing 38 rides up the lower taper bushing 40 raising the cap 50 which is secured to the ring gage tube off the top 52 of the driving tube 10 thereby providing the necessarily clearance enabling the cap 50 and hence the plug gage tube 22 to pivot. Once the plug gage has entered the finish, the ring gage spring 32 will center the plug gage allowing the cap 50 to once again close the top 52 of the driving tube 10.

A reject condition will exist if there is a constriction inside of the neck of the bottle or if the outside is malformed such that the ring gage can not pass over it. Should a reject condition exist, downward displacement of this tube and hence the plug gage sensor actuator 56 which is secured thereto will stop prior to its gaging position.

I claim:

1. A machine for gaging the inner diameter and outer diameter of a bottle opening comprising
    telescoping gage means including inner plug gage means and outer ring gage means,
    said plug gage means including a plug gage tube with a plug gage at one end,
    said ring gage means including a ring gage tube with a ring gage at one end, means for supporting said plug gage tube for axial displacement within said ring gage tube, including a first annular collar secured to the inner diameter of said ring gage tube and a second annular collar secured to the outer diameter of said plug gage tube and a first spring located between said plug and ring gage tubes and compressively located between said collars,
    a driving tube, open at the top thereof,
    ball and socket means located within said driving tube at one end thereof and having a hole extending therethrough for slidably receiving said ring gage tube,
    a pair of annular cooperating taper bearings, one of said taper bearings being located within said driving tube at the other end thereof and the second of said taper bearings being secured to the outer diameter of said ring gage tube and,
    a second spring located between said driving tube and said ring gage tube and compressively located between said ball and socket means and said second taper bearing so that said ring tube will normally be maintained in coaxial relation with said driving tube by said spring forcing said annular taper bearings into concentric relation to one another but said ring tube can be tilted relative to said driving tube about the center of said ball and socket means.

2. A machine according to claim 1 wherein said ring gage means further comprises cap means at the other end of said ring gage tube for closing the top opening of said ring gage tube for closing the top opening of said driving tube during normal operation, said pair of taper bearing means raising said cap means off said driving tube when said plug gage is tilted about the center of said ball and socket means.

* * * * *